United States Patent [19]

Aggarwal et al.

[11] Patent Number: 5,675,741
[45] Date of Patent: Oct. 7, 1997

[54] METHOD AND APPARATUS FOR DETERMINING A COMMUNICATIONS PATH BETWEEN TWO NODES IN AN INTERNET PROTOCOL (IP) NETWORK

[75] Inventors: Ajay Aggarwal, Somersworth; Walter Scott, Salem; Eric Rustici, Londonderry; David Bucciero, Nashua; Andrew Haskins, Lee; Wallace Matthews, Exeter, all of N.H.

[73] Assignee: Cabletron Systems, Inc., Rochester, N.H.

[21] Appl. No.: 328,513

[22] Filed: Oct. 25, 1994

[51] Int. Cl.$^6$ .................................................. G06F 13/00
[52] U.S. Cl. ....................... 395/200.12; 395/200.01; 395/200.15; 395/800; 364/DIG. 1
[58] Field of Search ..................... 395/200.01, 200.12, 395/200.15, 800; 364/DIG. 1

[56] References Cited

U.S. PATENT DOCUMENTS

| | | | |
|---|---|---|---|
| 5,056,085 | 10/1991 | Vu | 370/60 |
| 5,057,987 | 10/1991 | Conlon | 370/255 |
| 5,289,468 | 2/1994 | Yoshida | 370/85.13 |
| 5,355,453 | 10/1994 | Row et al. | 395/200 |
| 5,530,963 | 6/1996 | Moore et al. | 395/200.15 |
| 5,541,911 | 7/1996 | Nilakantan et al. | 370/13 |
| 5,550,984 | 8/1996 | Gelb | 395/200.17 |

FOREIGN PATENT DOCUMENTS 0 352 041  1/1990  European Pat. Off. .

OTHER PUBLICATIONS

Rose, "An Introduction to Management of TCP/IP-Based Internets" 1991, pp. 66-67.
Comer, "Internet Working with TCP/IP" vol. 1 1991, pp. 101-104.
Bell et al., "Review of Point-to-Point Network Routing Algorithms," IEEE Jan. 24, 1986, pp. 1-5.

*Primary Examiner*—Alyssa H. Bowler
*Assistant Examiner*—Dzung C. Nguyen
*Attorney, Agent, or Firm*—Wolf, Greenfield & Sacks, P.C.

[57] ABSTRACT

Method and apparatus for determining a communications path between a source and a destination in an Internet Protocol (IP) network. The method determines a path list of next-hop routers between the source and destination by selecting between a Simple Network Management Protocol (SNMP) query of a current router on the path, and by sending a User Datagram Protocol (UDP) probe packet having a destination field with a destination IP address and a Time-to-Live (TTL) field with a value of one greater than the number of hops to the current router. The steps are iterated until the next router is determined to be the destination. Preferably, the UDP probe packets are loose-source routed through the source. In addition, a topology information database may be accessed to resolve an unknown router, and/or resolve intrarouter devices on the path.

16 Claims, 3 Drawing Sheets

METHOD AND APPARATUS FOR DETERMINING A COMMUNICATIONS PATH BETWEEN TWO NODES IN AN INTERNET PROTOCOL (IP) NETWORK

FIELD OF THE INVENTION

This invention relates to computer network communication systems, and in particular to a method and apparatus for determining data paths on an IP network.

BACKGROUND OF THE INVENTION

In an Internet, several networks are connected together through the use of gateways and an internetworking protocol. The gateways (often called routers), using the protocol, hide the underlying details of the actual networks, in order to provide uniform service across the network.

The leading internetworking technology is the Internet suite of protocols, commonly referred to as TCP/IP, after the two-core protocols in the suite. TCP, the transmission control protocol, is a connection-oriented transport service. IP, the Internet protocol, is a connectionless-mode network service.

IP is called a connectionless-mode network protocol, which means that it is datagram-oriented. When some entity on the network wishes to send data using IP, it sends that data as a series of datagrams. Associated with each datagram is an address indicating where the datagram should be delivered. This address consists of an IP address, an upper-layer protocol number. IP takes the user-data and encapsulates it in an IP datagram, which contains all of the information necessary to deliver the datagram to the IP entity at the destination. The remote IP entity will examine the IP datagram it receives, and then strip off the data and pass it up to the appropriate upper-layer protocol. See, M. Rose, "The Simple Book—An Introduction To Management Of TCP/IP-Based Internets," Prentice Hall, 1991.

SNMP, Simple Network Management Protocol, has become the de facto operational standard for network management of TCP/IP-based internets. A managed network may be considered as consisting of three components: (1) several managed nodes, each containing an agent; (2) at least one network management station (NMS); and (3) a network management protocol, which is used by the station and the agents to exchange management information. The managed node may consist of a host system, e.g., workstation, terminal server, or printer; a gateway system, e.g., a router; or a media device, e.g., a bridge, hub or multiplexor. One activity of the network management system is to compile a topology of the network, defining the connections between various devices on the network. The network management system may query the IP routing table at each gateway, to determine what devices are located at each port on the gateway. This information may be used to construct a data path between any two devices on the internet.

Associated with IP is another protocol providing low-level feedback about how the internet layer is operating. This protocol is termed the "Internet Control Method Protocol" (ICMP). ICMP provides basic control messages for error reporting.

One useful tool in troubleshooting connectivity problems at the internet layer is a program called "traceroute." The traceroute program sends a series of "probe packets" using UDP to an IP address and awaits an ICMP reply. More specifically, IP datagrams carrying the UDP packets are sent with monotonically increasing values in the "time to live" (TTL) field, and the UDP port chosen is one most likely not to be in use. For each TTL value, the traceroute program sends a fixed number of packets (usually three), and reports back the IP addresses of the devices responding. This process continues until an ICMP port unreachable packet is received or some TTL threshold is reached (usually 30).

If a gateway receives an IP datagram and decrements the TTL to zero, then it returns an ICMP time exceeded packet. If the IP datagram eventually reaches the network device in question, an ICMP port unreachable packet will be returned. Combining the information from all the replies, the traceroute program can report on the whole route. See M. Rose, supra, at 66–67.

Unfortunately, traceroute does not provide any information about which ports of the routers are on the path. In addition, not all devices on the network support IP options needed to implement traceroute.

An SNMP query to a router is another method for tracing a route, i.e., by determining the next-hop router on the current router IP routing table. Unfortunately, not all routers can be accessed by It would thus be desirable to provide a method of tracing a route from any source to any destination, regardless of whether one router is known, and regardless of whether each router on the path can be accessed using SNMP.

SUMMARY OF THE INVENTION

The present invention is a method and apparatus for determining a communications path between a source node and a destination node on a network using IP. The method includes compiling a path list of IP addresses for next-hop routers on the path between the source IP address and the destination IP address.

In its broadest sense, the method includes the steps of: (a) sending a series of UDP probe packets out a socket of a first node to find successive next-hop routers on the path; (b) setting the socket of the first node to "loose route" the UDP probe packets through the source IP address; and (c) recording in the path list the next-hop router IP address returned following each one of the series of UDP probe packets. The UDP probe packets have a destination field set with the destination IP address. The time to live (TTL) field of the UDP probe packet is set with an initial value of one, and monotonically increased (i.e., incremented by one) to find each successive next-hop router until the destination is reached.

In a further embodiment, the method includes the step of alternatively sending an SNMP query to a router on the path in order to find the next-hop router on the path. Then, if the SNMP query fails, the method reverts to sending the next UDP probe packet. Thus, if a specific router on the path is discovered and can accept SNMP messages, we can then read its routing table to find out the next router on the way to the destination. The routing table also provides the port which leads to the next router.

In a still further embodiment, if both the UDP probe packet and/or SNMP query fail to provide the next-hop router IP address, then an unknown nexthop router IP address is selected and recorded in the path list. We later use a topology information database from a network management system to resolve this unknown router.

In a still further embodiment, the method includes sending a query to a topology information database to determine any unknown next-hop router IP addresses, as well as any intra-router (i.e., layer-2 devices, such as hubs, bridges, etc.) on the path.

In this manner, we can determine a complete route from a source node to a destination node. Apparatus for implementing the method is further provided, including a station with a memory and processor for storing and running the traceroute program and/or a network management station for maintaining a management database and sending SNMP queries to various routers on the network which are SNMP compatible.

DETAILED DESCRIPTION

Figure 1:
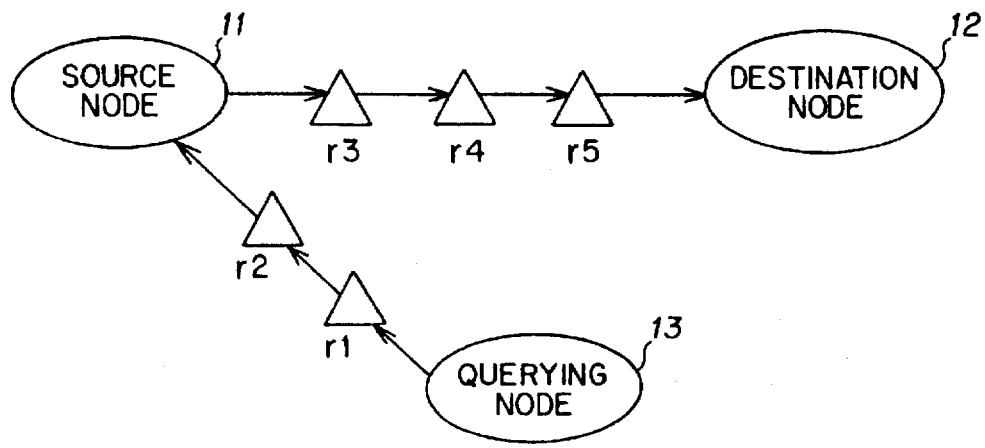
FIG. 1 is a schematic diagram of a portion of a network in which there is a source node, a destination node, and a querying node.

FIG. 1 illustrates a general example, where there is a source node 11, a destination node 12, and a querying node 13. Additionally, there are routers r1 and r2 between the querying node 13 and the source node 11, and routers r3, r4 and r5 between the source node 11 and destination node 12. This representative network will be used to illustrate the method of the present invention.

Figure 2:
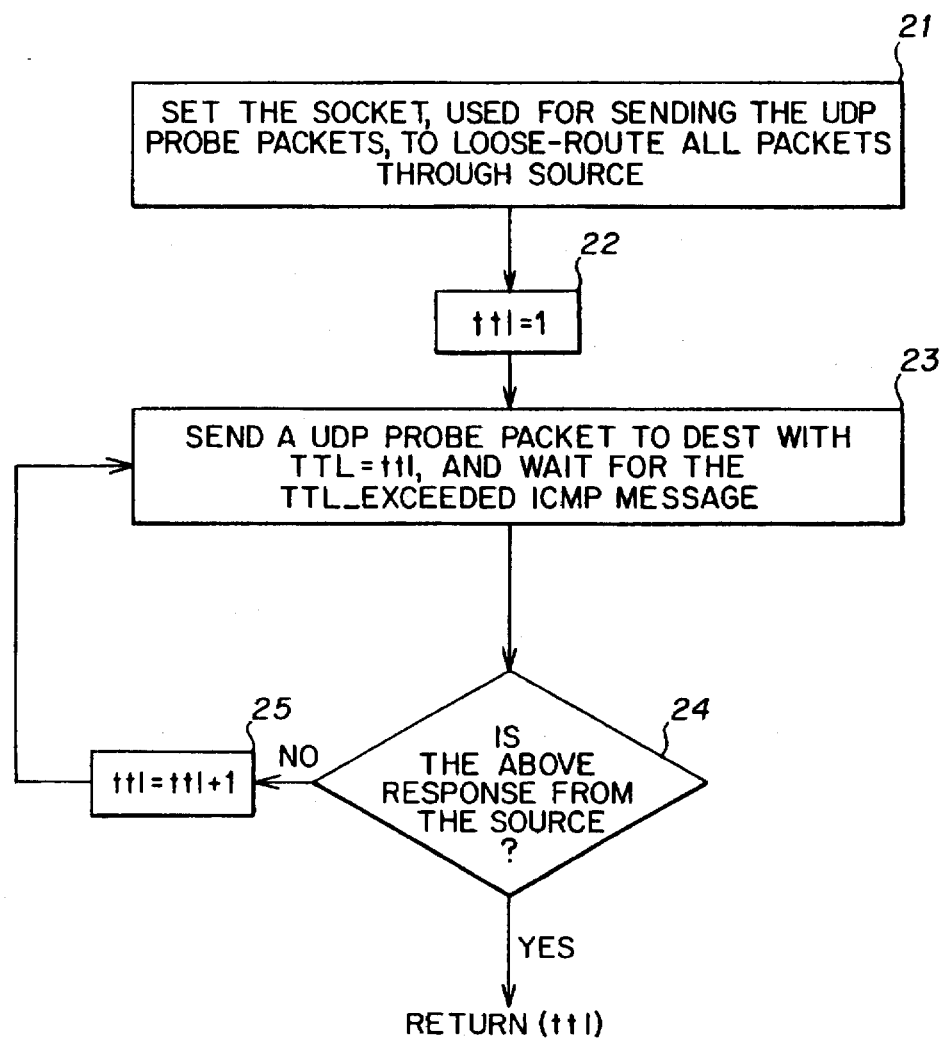
FIG. 2 is a flowchart illustrating a mechanism by which the distance, in TTL units, is determined between the querying node and the source node.

In a first incremental TTL mechanism, illustrated in FIG. 2, we set a socket in query node 13, used for sending the UDP probe packets, to "loose route" all packets through the source node 11. In this manner, we determine the number of routers between the querying node 13 and the source node 11, i.e., r1 and r2.

Once we know one router on the path, i.e., by the above incremental TTL mechanism, we can send an SNMP query to read its routing table to find out the next router on the path for the destination, along with the port which takes us to the next router. If this fails, we revert to the incremental TTL mechanism to find the next-hop router. If both fail, we still continue, adding an unknown router to the path list. Our subsequent discovery of a network management system topology database, e.g., the Spectrum™ program sold by Cabletron Systems, Inc. of Rochester, New Hampshire, may enable us to determine all unknown router nodes as well as identify any intra-router devices on the path.

More specifically, FIG. 2 illustrates the "how_far_is_source(source, dest)" portion of our program. In step 21, we set the "loose-source routing" IP option on the socket through which we are sending the UDP packets out. The source is the loose route we specify to the socket. Thus, all packets going through this socket will be routed through this loose route, i.e., source. See D. Comer, "Internetworking With TCP/IP, Vol. I, Principles, Protocols, And Architecture," Prentice Hall, 2nd ed., pp. 103–104 (1991). In step 22, we initialize by setting ttl=1, and in step 23 we send a UDP probe packet to the destination where TTL=ttl. In step 24 we wait for the TTL_EXCEEDED ICMP message. If this message is received from the source, then we return (ttl). If not, in step 25 we increment ttl by one and send another UDP probe packet.

Figure 3:
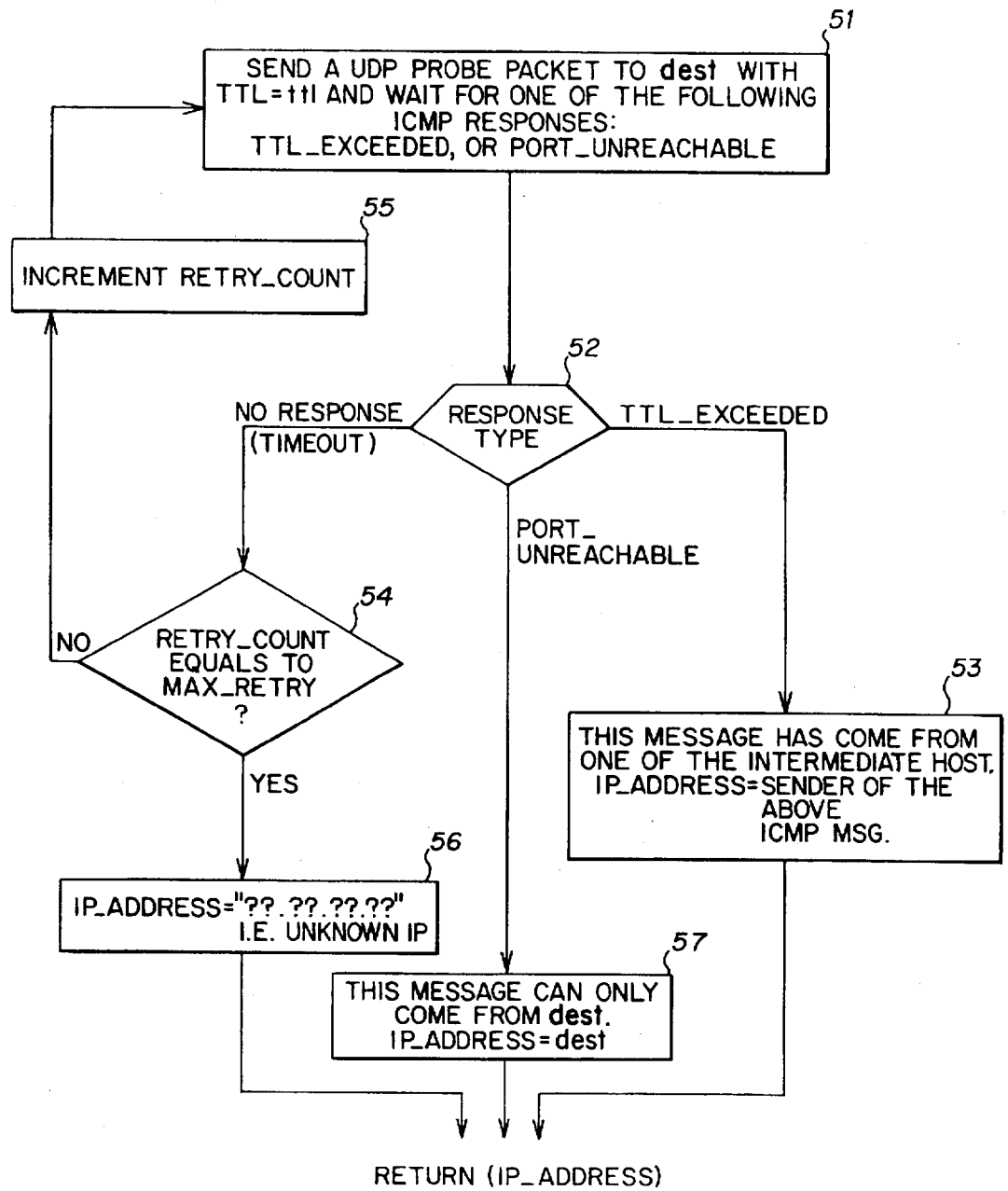
FIG. 3 is a flowchart illustrating a mechanism for locating the next-hop router along the path from the source node to the destination node using TTL.

If we are unable to contact a router with an SNMP query, or if we choose to continue using the TTL mechanism, we then utilize the "find_next_hop using_ttl(source, dest, ttl)" portion of our program illustrated in FIG. 3. Again, in step 51 we send a UDP probe packet to the destination with TTL=ttl and in step 52 we wait for one of the following ICMP responses: TTL_EXCEEDED, or PORT_UNREACHABLE. If the message TTL_EXCEEDED is received, this message has come from one of the intermediate hosts and in step 53 we set IP address=sender of the ICMP message and record its IP address in our path list. If in step 54 no response is received within a designated time period, in step 55 we increment the retry_count and send another UDP probe packet (return to step 51). If (in step 54) we have reached the maximum period, i.e., MAX_RETRY, then we set the IP address to an unknown IP address (step 56) and enter the same in the path list.

If a PORT_UNREACHABLE message is received (step 57), this message can only come from the destination and therefore we enter the IP address of the destination in our path list and we are finished.

Figure 4:
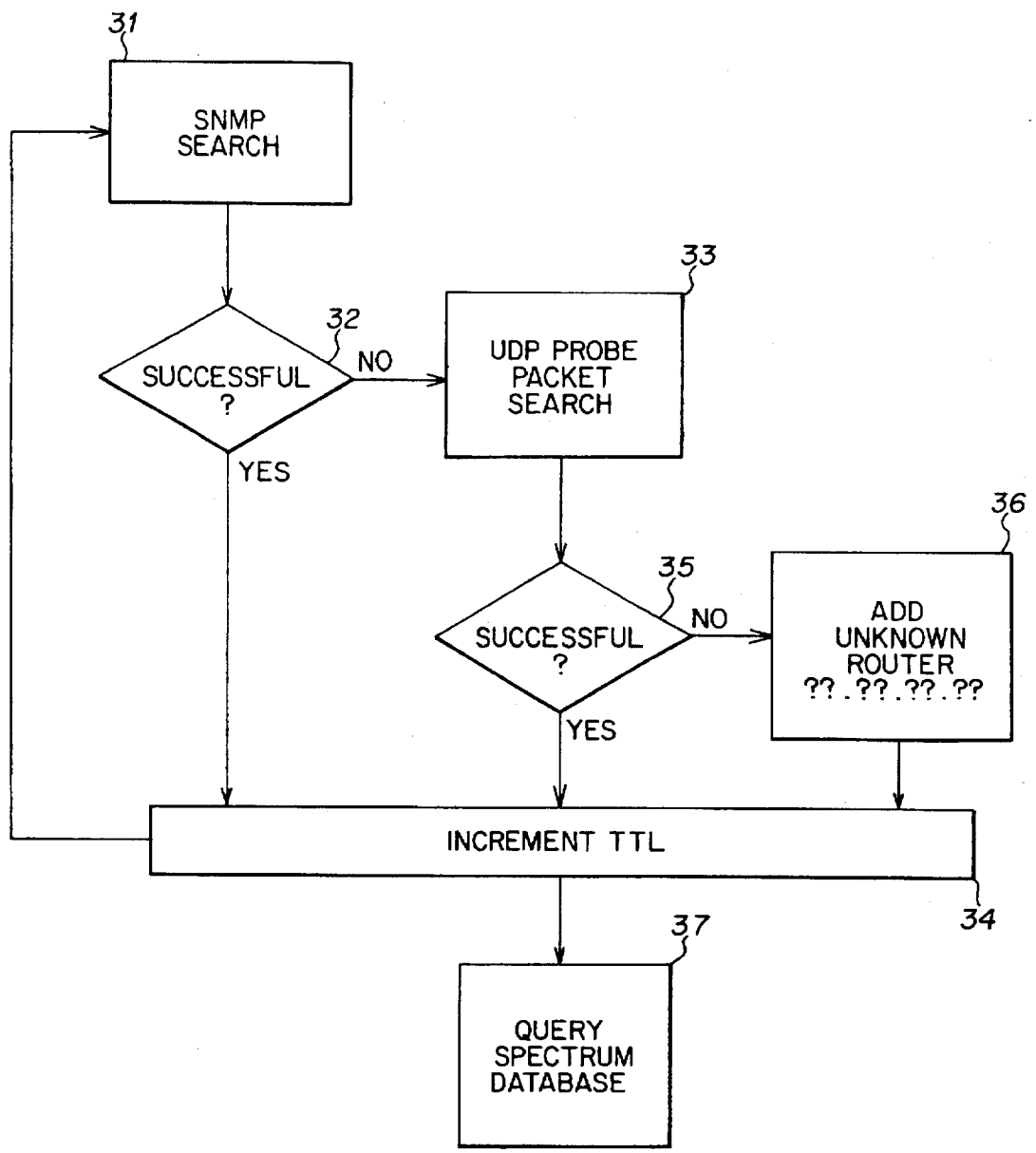
FIG. 4 is a flowchart illustrating the overall mechanism for locating the next router utilizing either an SNMP query or UDP probe packet.

FIG. 4 illustrates generally a preferred method in which we first try an SNMP search 31 (assuming we have a known router), and if it is successful (step 32), we continue to increment TTL (step 34) and then return to conduct an SNMP search (step 31) on the next-hop router. If the SNMP search is not successful, we send (step 33) a UDP probe packet to determine the next-hop router. If this is successful (step 35), we again increment TTL (step 34) and then conduct an SNMP search on the next-hop router. If the UDP probe packet search is not successful, we add (step 36) an unknown router address to our path list and then increment TTL (step 34). Once we have reached the destination, we can then query our management database (i.e., Spectrum™) (step 37) to determine all the intra-router devices, i.e. layer-2 devices including hubs, bridges, etc., between each pair of routers discovered previously. We can also use the management database to try to resolve the unknown router nodes in the path list. Essentially, we use management database's knowledge of how the various device models are connected to each other. For example, Spectrum™ acquires this knowledge during an "autodiscovery" process of all the devices on the network. The Spectrum™ network management platform is described in U.S. Pat. No. 5,261,044 and in copending and commonly owned U.S. Ser. No. 07/797,121 filed Nov. 22, 1991 by R. Dev et al., which are hereby incorporated by reference in their entirety. Spectrum™ implements the Autodiscovery process described in copending and commonly owned U.S. Ser. No. 08/115,232 filed Sep. 1, 1993 by T. Orr et al., which is also incorporated by reference in its entirety. The present invention is not limited to use of the Spectrum™ database, but contemplates the use of any such topology database which defines the relative location of devices on the network.

Figure 5:
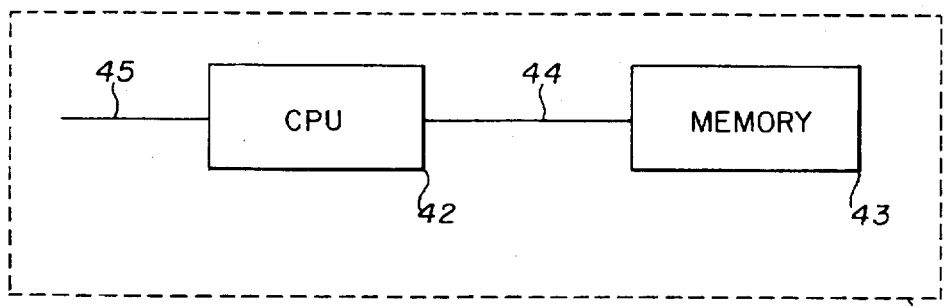
FIG. 5 is a block diagram of a general purpose computer, for implementing the various path determination methods of this invention.

The program may be implemented in a general purpose computer 4I such as shown in FIG. 5. As can be seen, the general purpose computer includes a computer processing unit (CPU) 42, memory 43, a processing bus 44 by which the CPU can access the memory, and access to a network 45.

The following code can be used to illustrate the method of this invention:

```
discover_ip_path (source, dest)
(
//Variables used:
//
//      source:    user specified source IP address
//      dest:      user specified destination IP address
//      curr_ttl:  this will be used to find the next
                   router when the TTL mechanism is
                   used.
//      path_list: list used for storing the discovered
                   path
        sending-socket = open a RAW socket to send out
        the UDP probe packets.
        if (source is same as the station running this
        application)
        (
            curr_ttl = 0
        )
        else
        (
            Set the sending-socket to loose-route UDP probe
            packets through the source. This will be used in
            "how_far_is_source" and "trace_next_hop_using_
            ttl" calls below.
            curr_ttl = how_far_is_source (source, dest)
        )
        curr_node = source
        path_list = empty list.
        while (curr_node != dest)
        (
            next_hop = NULL
            if (curr_node is a router and Spectrum has a SNMP
            model for it)
            (
                next_hop = trace_next_hop_using_snmp (dest.
                curr_node)
            )
            if (! next_hop) // SNMP method failed. Let's try
            TTL method.
            (
                next_hop = trace_next_hop_using_ttl (dest, curr_
                ttl);
            )
            if (! next_hop) // Even the TTL method failed.
            (
                path_list->add (unknown_router);
            )
            else
            (
                path_list->add (next_hop)
            )
            curr_ttl++      // increment curr_ttl
            curr_node = next_hop
        )
        phase_2_discovery (path_list);
)
how_far_is_source (source, dest)
(
```

Use incremental TTL value program to find out how many hops away is the source from the station running this program.

Note: that all UDP packets used herein originate from the station running this program and are destined for dest. The loose-routing option set above will force these packets to take following path:

```
                source ---------->dest
                ↑
                application running this program
        )
        trace_next_hop_using_ttl (dest, curr_ttl)
        (
            Sending-socket is already set to loose-route the
            packets through source.
```

```
            send a UDP probe packet to dest with TTL value
            equal to (curr_ttl+1) and wait for the ICMP TTL_
            EXPIRED message.
            This message will come from the next router we
            are locking for.
        )
        trace_next_hop_using_snmp (dest, curr_node)
        (
```

This method uses SNMP queries to find out the next node in the path. IP routing table is read from the curr_node to find out the next hop for the given destination.

If the dest address is a.b.d.c., we try to read the next hop values for the following addresses (in this order) until one succeeds:

a.b.c.d a.b.c.0 a.b.0.0 a.0.0.0

If the next hop value is successfully found, we also return the corresponding port information (i.e. port of curr_node which connects to the next-hop).

The following is an example of an SNMP routing table:

| Destination   | Next-Hop           | Out_port  |
| ---           | ---                | ---       |
| 134.141.1.0   | via 134.141.150.251 | Ethernet1 |
| 134.141.7.0   | via 134.141.150.251 | Ethernet1 |
| 134.141.6.0   | via 134.141.150.251 | Ethernet1 |
| 134.141.159.0 | via 134.141.155.254 | Serial0   |
| 134.141.153.0 | directly connected | Ethernet0 |
| 134.141.152.0 | directly connected | Ethernet1 |

If a search of the IP routing table fails to find the next hop, it returns an invalid IP address. This causes the "discover_ip_path ()" method to use the "find_next_hop_using_TTL ()" method to find the next hop.

EXAMPLE

The following example illustrates a method of the invention in accordance with the representative network shown in FIG. 1.

In this example, arrows show the path the UDP probe packets are going to take.

querying: the node running this program source: given source IP address dest: given dest IP address r1, r2: routers between querying node and source r3, r4, r5: routers between source and dest The socket used for sending the UDP probe packets from the querying node is set to loose-route all packets through source. Also, all the UDP probe packets are sent to dest on an unused destination port number, so that if the probe reaches the dest, the dest will send us back a PORT_UNREACHABLE ICMP message.

how_far_is_source (source, dest)

For ttl=1, r1 will send the TTL_EXCEEDED ICMP message, for ttl=2, r2 will send the TTL_EXCEEDED ICMP message for ttl=3, source will send the TTL_EXCEEDED ICMP message and this method will return 3.

subsequent discovery

The subsequent discovery will depend on whether we have SNMP models for source, r3, r4 and r5 etc. in our Spectrum™ database, e.g., r3 will be discovered by reading the routing table from the source or using the TTL mechanism with TTL=4 r4 will be discovered by reading the routing table from r3 or using the TTL mechanism with TTL=5

Similarly r5 will be discovered by reading the routing table from r4 or using the TTL mechanism with TTL=6

Finally, we will know that dest is directly connected to r5, either by reading a direct routing entry for dest from r5, or using TTL mechanism (TTL=7) we will receive a PORT UNREACHABLE ICMP message from the dest.

Having thus described a particular embodiment of the invention, various alterations, modifications and improvements will readily occur to those skilled in the art. Accordingly, the foregoing description is by way of example only, and not intended to be limiting. The invention is limited only as defined in the following claims and the equivalents thereto.

Appendix A

```
*
* Copyright (c) 1988 Regents of the University of California.
* All rights reserved.
*
* Redistribution and use in source and binary forms are permitted
* provided that the above copyright notice and this paragraph are
* duplicated in all such forms and that any documentation,
* advertising materials, and other materials related to such
* distribution and use acknowledge that the software was developed
* by the University of California, Berkeley. The name of the
```

A-1

```
 * University may not be used to endorse or promote products derived
 * from this software without specific prior written permission.
 * THIS SOFTWARE IS PROVIDED ``AS IS'' AND WITHOUT ANY EXPRESS OR
 * IMPLIED WARRANTIES, INCLUDING, WITHOUT LIMITATION, THE IMPLIED
 * WARRANTIES OF MERCHANTIBILITY AND FITNESS FOR A PARTICULAR PURPOSE.
 */
[7m--More--[m
[;H[2J include <stdio.h>
include <errno.h>
#include <strings.h>
include <sys/time.h> include <sys/param.h>
include <sys/socket.h>
#include <sys/file.h>
include <sys/ioctl.h> include <netinet/in_systm.h>
include <netinet/in.h>
#include <netinet/ip.h>
#include <netinet/ip_var.h>
#include <netinet/ip_icmp.h>
#include <netinet/udp.h>
#include <netdb.h>
include <ctype.h> define MAXPACKET   65535   /* max ip packet size */
ifndef MAXHOSTNAMELEN
#define MAXHOSTNAMELEN   64
[7m--More--[m
[;H[2J
endif ifndef FD_SET
define NFDBITS       (8*sizeof(fd_set))
#define FD_SETSIZE    NFDBITS
#define FD_SET(n, p)   ((p)->fds_bits[(n)/NFDBITS] |= (1 << ((n) % NFDBITS)))
#define FD_CLR(n, p)   ((p)->fds_bits[(n)/NFDBITS] &= ~(1 << ((n) % NFDBITS)))
#define FD_ISSET(n, p) ((p)->fds_bits[(n)/NFDBITS] & (1 << ((n) % NFDBITS)))
#define FD_ZERO(p)     bzero((char *)(p), sizeof(*(p)))
endif define Fprintf (void)fprintf
define Sprintf (void)sprintf
define Printf (void)printf extern  int errno;
extern  char *malloc();
extern  char *inet_ntoa();
extern  u_long inet_addr();

/*
```

A-2

```
 * format of a (udp) probe packet.
 */
[7m--More--[m
[;H[2J
struct opacket {
        struct ip ip;
        struct udphdr udp;
        u_char seq;             /* sequence number of this packet */
        u_char ttl;             /* ttl packet left with */
        struct timeval tv;  /* time packet left */
};

u_char    packet[512];          /* last inbound (icmp) packet */
struct opacket   *outpacket;    /* last output (udp) packet */
char *inetname();

int s;                          /* receive (icmp) socket file descriptor */
int sndsock;                    /* send (udp) socket file descriptor */
struct timezone tz;             /* leftover */ struct sockaddr whereto;        /* Who to try to reach */
int datalen;                    /* How much data */ char *source = 0;
char *hostname;
char hnamebuf[MAXHOSTNAMELEN];

[7m--More--[m
[;H[2J
int nprobes = 3;
int max_ttl = 30;
u_short ident;
u_short port = 32768+666;       /* start udp dest port # for probe packets */ int options;                    /* socket options */
int verbose;
int waittime = 5;               /* time to wait for response (in seconds) */
int nflag;                      /* print addresses numerically */ char usage[] =
"Usage: traceroute [-dnrv] [-w wait] [-m max_ttl] [-p port#] [-q nqueries] [-t tos] [-s src_addr] [-g gateway] host [data size]\n";

main(argc, argv)
        char *argv[];
{
        struct sockaddr_in from;
        char **av = argv;
        struct sockaddr_in *to = (struct sockaddr_in *) &whereto;
        int on = 1;
        struct protoent *pe;
        int ttl, probe, i;
```

```
        int seq = 0;
        int tos = 0;
        struct hostent *hp;
        int lsrr = 0;
        u_long gw;
        u_char optlist[MAX_IPOPTLEN], *oix;

oix = optlist;
        bzero(optlist, sizeof(optlist));

argc--, av++;
        while (argc && *av[0] == '-') {
                while (*++av[0])
                        switch (*av[0]) {
                        case 'd':
                                options |= SO_DEBUG;
                                break;
                        case 'g':
                                argc--, av++;
                                if ((lsrr+1) >= ((MAX_IPOPTLEN-IPOPT_MINOFF)/sizeof(u_long)))
                                        Fprintf(stderr,"No more than %d gateways\n",
                                                ((MAX_IPOPTLEN-IPOPT_MINOFF)/sizeof(u_long))-1);
                                        exit(1);
                                }
                                if (lsrr == 0) {
                                        *oix++ = IPOPT_LSRR;
                                        *oix++;          /* Fill in total length later */
                                        *oix++ = IPOPT_MINOFF; /* Pointer to LSRR addresses */
                                }
                                lsrr++;
                                if (isdigit(*av[0])) {
                                        gw = inet_addr(*av);
                                        if (gw) {
                                                bcopy(&gw, oix, sizeof(u_long));
                                        } else {
                                                Fprintf(stderr, "Unknown host %s\n",av[0]);
                                                exit(1);
                                        }
                                } else {
                                        hp = gethostbyname(av[0]);
                                        if (hp) {
                                                bcopy(hp->h_addr, oix, sizeof(u_long));
                                        } else {
                                                Fprintf(stderr, "Unknown host %s\n",av[0]);
                                                exit(1);
                                        }
```

A-4

```
                    }
                    oix += sizeof(u_long);
                    goto nextarg;
            case 'm':
                    argc--, av++;
                    max_ttl = atoi(av[0]);
                    if (max_ttl <= 1) {
                            Fprintf(stderr, "max ttl must be >1\n");
                            exit(1);
                    }
                    goto nextarg;
            case 'n':
                    nflag++;
                    break;
            case 'p':
                    argc--, av++;
                    port = atoi(av[0]);
                    if (port < 1) {
                            Fprintf(stderr, "port must be >0\n");
                            exit(1);
                    }
                    goto nextarg;
            case 'q':
                    argc--, av++;
                    nprobes = atoi(av[0]);
                    if (nprobes < 1) {
                            Fprintf(stderr, "nprobes must be >0\n");
                            exit(1);
                    }
                    goto nextarg;
            case 'r':
                    options |= SO_DONTROUTE;
                    break;
            case 's':
                    /*
                     * set the ip source address of the outbound
                     * probe (e.g., on a multi-homed host).
                     */
                    argc--, av++;
                    source = av[0];
                    goto nextarg;
            case 't':
                    argc--, av++;
                    tos = atoi(av[0]);
                    if (tos < 0 || tos > 255) {
                            Fprintf(stderr, "tos must be 0 to 255\n");
                            exit(1);
                    }
                    goto nextarg;
            case 'v':
```

A-5

```
                                        verbose++;
                                        break;
                        case 'w':
                                argc--, av++;
                                waittime = atoi(av[0]);
                                if (waittime <= 1) {
                                        Fprintf(stderr, "wait must be >1 sec\n");
                                        exit(1);
                                }
                                goto nextarg;
                }
        nextarg:
                argc--, av++;
        }
[7m--More--[m
|:H[2J
        if (argc < 1) {
                Printf(usage);
                exit(1);
        }
        setlinebuf (stdout);

(void) bzero((char *)&whereto, sizeof(struct sockaddr));
        to->sin_family = AF_INET;
        to->sin_addr.s_addr = inet_addr(av[0]);
        if (to->sin_addr.s_addr != -1) {
                (void) strcpy(hnamebuf, av[0]);
                hostname = hnamebuf;
        } else {
                hp = gethostbyname(av[0]);
                if (hp) {
                        to->sin_family = hp->h_addrtype;
                        bcopy(hp->h_addr, (caddr_t)&to->sin_addr, hp->h_length);
                hostname = hp->h_name;
                } else {
                        Printf("%s: unknown host %s\n", argv[0], av[0]);
                        exit(1);
                }
        }
[7m--More--[m
|:H[2J
        if (argc >= 2)
                datalen = atoi(av[1]);
        if (datalen < 0 || datalen >= MAXPACKET - sizeof(struct opacket)) {
                Fprintf(stderr, "traceroute: packet size must be 0 <= s < %ld\n",
                        MAXPACKET - sizeof(struct opacket));
                exit(1);
        }
        datalen += sizeof(struct opacket);
        outpacket = (struct opacket *)malloc((unsigned)datalen);
        if (! outpacket) {
                perror("traceroute: malloc");
                exit(1);
```

A-6

```
        }
        (void) bzero((char *)outpacket, datalen);
        outpacket->ip.ip_dst = to->sin_addr;
        outpacket->ip.ip_tos = tos;

ident = (getpid() & 0xffff) | 0x8000;

if ((pe = getprotobyname("icmp")) == NULL) {
                Fprintf(stderr, "icmp: unknown protocol\n");
[7m--More--[m
[;H[2J
                exit(10);
        }
        if ((s = socket(AF_INET, SOCK_RAW, pe->p_proto)) < 0) {
                perror("traceroute: icmp socket");
                exit(5);
        }
    else
    {
       printf ("Opened recv side RAW socket, proto [ICMP] = %d\n",
            pe->p_proto ) ;
    }
        if (options & SO_DEBUG)
                (void) setsockopt(s, SOL_SOCKET, SO_DEBUG,
                                  (char *)&on, sizeof(on));
        if (options & SO_DONTROUTE)
                (void) setsockopt(s, SOL_SOCKET, SO_DONTROUTE,
                                  (char *)&on, sizeof(on));

if ((sndsock = socket(AF_INET, SOCK_RAW, IPPROTO_RAW)) < 0) {
                perror("traceroute: raw socket");
                exit(5);
[?1h=   }
    else
[7m--More--[m
[;H[2J
    {
       printf ("Opened send side RAW socket, proto=IPPROTO_RAW \n");
    } if (lsrr > 0) {
        lsrr++;
        optlist[IPOPT_OLEN]=IPOPT_MINOFF-1+(lsrr*sizeof(u_long));

printf ("optlist[IPOPT_OLEN] = %d\n", optlist[IPOPT_OLEN] );

bcopy((caddr_t)&to->sin_addr, oix, sizeof(u_long));
        oix += sizeof(u_long);
        while ((oix - optlist)&3) oix++;        /* Pad to an even boundry */ hex_display (optlist, (optlist[IPOPT_OLEN] + 4) );

if ((pe = getprotobyname("ip")) == NULL) {
          perror("traceroute: unknown protocol ip\n");
```

A-7

```
              exit(10);
        }
        if ((setsockopt(sndsock, pe->p_proto, IP_OPTIONS, optlist, oix-optlist)) < 0) {
[7m--More--|m
[;H[2J
            perror("traceroute: lsrr options");
            exit(5);
        }
        else
        {
          printf ("Set IP_OPTIONS (for loose routing), proto used=%d\n",
              pe->p_proto );
        }
    } ifdef SO_SNDBUF printf ("Using setsockopt SOL_SOCKET, SO_SNDBUF \n");

if (setsockopt(sndsock, SOL_SOCKET, SO_SNDBUF, (char *)&datalen,
                sizeof(datalen)) < 0) {
            perror("traceroute: SO_SNDBUF");
            exit(6);
        }
#endif SO_SNDBUF
ifdef IP_HDRINCL printf ("IP_HDRINCL defined \n");
[7m--More--|m
[;H[2J
        if (setsockopt(sndsock, IPPROTO_IP, IP_HDRINCL, (char *)&on,
                sizeof(on)) < 0) {
            perror("traceroute: IP_HDRINCL");
            exit(6);
        }
#endif IP_HDRINCL
        if (options & SO_DEBUG)
            (void) setsockopt(sndsock, SOL_SOCKET, SO_DEBUG,
                            (char *)&on, sizeof(on));
        if (options & SO_DONTROUTE)
            (void) setsockopt(sndsock, SOL_SOCKET, SO_DONTROUTE,
                            (char *)&on, sizeof(on));

if (source) {
            (void) bzero((char *)&from, sizeof(struct sockaddr));
            from.sin_family = AF_INET;
            from.sin_addr.s_addr = inet_addr(source);
            if (from.sin_addr.s_addr == -1) {
                    Printf("traceroute: unknown host %s\n", source);
                    exit(1);
            }
            outpacket->ip.ip_src = from.sin_addr;
```

A-8

```
[7m--More--[m
[;H[2J
ifndef IP_HDRINCL if (bind(sndsock, (struct sockaddr *)&from, sizeof(from)) < 0) {
        perror ("traceroute: bind:");
                        exit (1);
                }
#endif IP_HDRINCL
        }

Fprintf(stderr, "traceroute to %s (%s)", hostname,
                inet_ntoa(to->sin_addr));
        if (source)
                Fprintf(stderr, " from %s", source);
        Fprintf(stderr, ", %d hops max, %d byte packets\n", max_ttl, datalen);
        (void) fflush(stderr);

for (ttl = 1; ttl <= max_ttl; ++ttl) {
                u_long lastaddr = 0;
                int got_there = 0;
                int unreachable = 0;

Printf("%2d ", ttl);
                for (probe = 0; probe < nprobes; ++probe) {
[7m--More--[m
[;H[2J
                        int cc;
                        struct timeval tv;
                        struct ip *ip;

(void) gettimeofday(&tv, &tz);
                        send_probe(++seq, ttl);
                        while (cc = wait_for_reply(s, &from)) {
                                if ((i = packet_ok(packet, cc, &from, seq))) {
                                        int dt = deltaT(&tv);
                                        if (from.sin_addr.s_addr != lastaddr) {
                                                print(packet, cc, &from);
                                                lastaddr = from.sin_addr.s_addr;
                        }
                                        Printf(" %d ms", dt);
                                        switch(i - 1) {
                                        case ICMP_UNREACH_PORT:
#ifndef ARCHAIC
                                                ip = (struct ip *)packet;
                                                if (ip->ip_ttl <= 1)
                                                        Printf(" !");
#endif ARCHAIC
                                                ++got_there;
                                                break;
[7m--More--[m
[;H[2J
                                        case ICMP_UNREACH_NET:
                                                ++unreachable;
```

```
                                        Printf(" !N");
                                        break;
                                case ICMP_UNREACH_HOST:
                                        ++unreachable;
                                        Printf(" !H");
                                        break;
                                case ICMP_UNREACH_PROTOCOL:
                                        ++got_there;
                                        Printf(" !P");
                                        break;
                                case ICMP_UNREACH_NEEDFRAG:
                                        ++unreachable;
                                        Printf(" !F");
                                        break;
                                case ICMP_UNREACH_SRCFAIL:
                                        ++unreachable;
                                        Printf(" !S");
                                        break;
                                }
                                break;
                        }
[7m--More--[m
[;H[2J
                        }
                        if (cc == 0)
                                Printf(" *");
                        (void) fflush(stdout);
                }
                putchar('\n');
                if (got_there || unreachable >= nprobes-1)
                        exit(0);
        }
} wait_for_reply(sock, from)
        int sock;
        struct sockaddr_in *from;
{
        fd_set fds;
        struct timeval wait;
        int cc = 0;
        int fromlen = sizeof (*from);

FD_ZERO(&fds);
        FD_SET(sock, &fds);
        wait.tv_sec = waittime; wait.tv_usec = 0;
[7m--More--[m
[;H[2J if (select(sock+1, &fds, (fd_set *)0, (fd_set *)0, &wait) > 0)
                cc=recvfrom(s, (char *)packet, sizeof(packet), 0,
                                (struct sockaddr *)from, &fromlen);

return(cc);
```

```
} send_probe(seq, ttl)
{
        struct opacket *op = outpacket;
        struct ip *ip = &op->ip;
        struct udphdr *up = &op->udp;
        int i;

ip->ip_off = 0;
        ip->ip_p = IPPROTO_UDP;
        ip->ip_len = datalen;
        ip->ip_ttl = ttl;

up->uh_sport = htons(ident);
        up->uh_dport = htons(port+seq);
        up->uh_ulen = htons((u_short)(datalen - sizeof(struct ip)));
[7m--More--[m
[:H[2J
        up->uh_sum = 0;

op->seq = seq;
        op->ttl = ttl;
        (void) gettimeofday(&op->tv, &tz);

i = sendto(sndsock, (char *)outpacket, datalen, 0, &whereto,
                sizeof(struct sockaddr));
        if (i < 0 || i != datalen) {
                if (i<0)
                        perror("sendto");
                Printf("traceroute: wrote %s %d chars, ret=%d\n", hostname,
                        datalen, i);
                (void) fflush(stdout);
        }
} deltaT(tp)
        struct timeval *tp;
{
        struct timeval tv;

(void) gettimeofday(&tv, &tz);
[7m--More--[m
[:H[2J
        tvsub(&tv, tp);
        return (tv.tv_sec*1000 + (tv.tv_usec + 500)/1000);
}

/*
 * Convert an ICMP "type" field to a printable string.
 */
char *
pr_type(t)
        u_char t;
```

A-11

```
{
        static char *ttab[] = {
        "Echo Reply",    "ICMP 1",       "ICMP 2",          "Dest Unreachable",
        "Source Quench", "Redirect",     "ICMP 6",          "ICMP 7",
        "Echo",          "ICMP 9",       "ICMP 10",         "Time Exceeded",
        "Param Problem", "Timestamp",    "Timestamp Reply", "Info Request",
        "Info Reply"
        };

if(t > 16)
                return("OUT-OF-RANGE");

return(ttab[t]);
[7m--More--[m
[;H[2J
} packet_ok(buf, cc, from, seq)
        u_char *buf;
        int cc;
        struct sockaddr_in *from;
        int seq;
{
        register struct icmp *icp;
        u_char type, code;
        int hlen;
#ifndef ARCHAIC
        struct ip *ip;

ip = (struct ip *) buf;
        hlen = ip->ip_hl << 2;
        if (cc < hlen + ICMP_MINLEN) {
                if (verbose)
                        Printf("packet too short (%d bytes) from %s\n", cc,
                                inet_ntoa(from->sin_addr));
                return (0);
        }
        cc -= hlen;
[7m--More--[m
[;H[2J
        icp = (struct icmp *)(buf + hlen);
#else
        icp = (struct icmp *)buf;
#endif ARCHAIC
        type = icp->icmp_type; code = icp->icmp_code;
        if ((type == ICMP_TIMXCEED && code == ICMP_TIMXCEED_INTRANS) ||
            type == ICMP_UNREACH) {
                struct ip *hip;
                struct udphdr *up;

hip = &icp->icmp_ip;
                hlen = hip->ip_hl << 2;
                up = (struct udphdr *)((u_char *)hip + hlen);
                if (hlen + 12 <= cc && hip->ip_p == IPPROTO_UDP &&
```

A-12

```
                        up->uh_sport == htons(ident) &&
                        up->uh_dport == htons(port+seq))
                                return (type == ICMP_TIMXCEED? -1 : code+1);
        }
#ifndef ARCHAIC
        if (verbose) {
                int i;
                u_long *lp = (u_long *)&icp->icmp_ip;

[7m--More--[m
[;H[2J
                Printf("\n%d bytes from %s to %s", cc,
                        inet_ntoa(from->sin_addr), inet_ntoa(ip->ip_dst));
                Printf(": icmp type %d (%s) code %d\n", type, pr_type(type),
                        icp->icmp_code);
                for (i = 4; i < cc ; i += sizeof(long))
                        Printf("%2d: x%8.8lx\n", i, *lp++);
        }
#endif ARCHAIC
        return(0);
} print(buf, cc, from)
        u_char *buf;
        int cc;
        struct sockaddr_in *from;
{
        struct ip *ip;
        int hlen;

ip = (struct ip *) buf;
        hlen = ip->ip_hl << 2;
        cc -= hlen;

[7m--More--[m
[;H[2J
        if (nflag)
                Printf(" %s", inet_ntoa(from->sin_addr));
        else
                Printf(" %s (%s)", inetname(from->sin_addr),
                        inet_ntoa(from->sin_addr));

if (verbose)
                Printf (" %d bytes to %s", cc, inet_ntoa (ip->ip_dst));
} ifdef notyet
/*
 * Checksum routine for Internet Protocol family headers (C Version)
 */
in_cksum(addr, len)
u_short *addr;
int len;
{
```

```
        register int nleft = len;
        register u_short *w = addr;
        register u_short answer;
        register int sum = 0;

[7m--More--[m
[;H[2J
        /*
         * Our algorithm is simple, using a 32 bit accumulator (sum),
         * we add sequential 16 bit words to it, and at the end, fold
         * back all the carry bits from the top 16 bits into the lower
         * 16 bits.
         */
        while (nleft > 1) {
                sum += *w++;
                nleft -= 2;
        }

/* mop up an odd byte, if necessary */
        if (nleft == 1)
                sum += *(u_char *)w;

/*
         * add back carry outs from top 16 bits to low 16 bits
         */
        sum = (sum >> 16) + (sum & 0xffff);    /* add hi 16 to low 16 */
        sum += (sum >> 16);                     /* add carry */
        answer = ~sum;                          /* truncate to 16 bits */
        return (answer);
}
[7m--More--[m
[;H[2J
endif notyet /*
 * Subtract 2 timeval structs:  out = out - in.
 * Out is assumed to be >= in.
 */
tvsub(out, in)
register struct timeval *out, *in;
{
        if ((out->tv_usec -= in->tv_usec) < 0) {
                out->tv_sec--;
                out->tv_usec += 1000000;
        }
        out->tv_sec -= in->tv_sec;
}

/*
 * Construct an Internet address representation.
 * If the nflag has been supplied, give
 * numeric value, otherwise try for symbolic name.
 */
char *
```

```
inetname(in)
[7m--More--[m
[;H[2J
        struct in_addr in;
{
        register char *cp;
        static char line[50];
        struct hostent *hp;
        static char domain[MAXHOSTNAMELEN + 1];
        static int first = 1;

if (first && !nflag) {
                first = 0;
                if (gethostname(domain, MAXHOSTNAMELEN) == 0 &&
                    (cp = index(domain, '.')))
                        (void) strcpy(domain, cp + 1);
                else
                        domain[0] = 0;
        }
        cp = 0;
        if (!nflag && in.s_addr != INADDR_ANY) {
                hp = gethostbyaddr((char *)&in, sizeof (in), AF_INET);
                if (hp) {
                        if ((cp = index(hp->h_name, '.')) &&
                            !strcmp(cp + 1, domain))
                                *cp = 0;
[7m--More--[m
[;H[2J
                        cp = hp->h_name;
                }
        }
        if (cp)
                (void) strcpy(line, cp);
        else {
                in.s_addr = ntohl(in.s_addr);
#define C(x)    ((x) & 0xff)
                Sprintf(line, "%lu.%lu.%lu.%lu", C(in.s_addr >> 24),
                    C(in.s_addr >> 16), C(in.s_addr >> 8), C(in.s_addr));
        }
        return (line);
} hex_display (ptr, how_much )
unsigned char * ptr;
int how_much;
{
  int i;

for (i=0; i < how_much; i++)
  {
    if ( ( i % 8) == 0)
[7m--More--[m
[;H[2J
    {
```

A-15

```
      printf ("\n");
    }
    printf ("%4x ", ptr[i] );
  } printf ("\n");

}

--------------------- end traceroute.c ---------------------
```

We claim:

1. A method for determining a communications path between a source and a destination in an Internet Protocol (IP) network, comprising the steps of:
   a. determining a current router;
   b. determining a next router on the communications path from a current router based on a selected one of steps b(i) and b(ii), wherein the last router determined is the current router:
      b(i) determining the next router via a Simple Network Management Protocol (SNMP) query of the current router;
      b(ii) determining the next router by sending a User Datagram Protocol (UDP) probe packet having a destination field with the destination IP address and a Time-To-Live (TTL) field with a value of one greater than the number of hops to the current router;
   c. iterating step b. until the next router is determined to be the destination, wherein if the selected one of steps b(i) and b(ii) fails, then the other one of these steps b(i) and b(ii) is utilized to determine the next router; and
   d. recording in a path list each determined next router on the path between the source and destination.

2. The method of claim 1, wherein the UDP probe packet is loose-source routed through the source.

3. The method of claim 1, wherein the method is initiated by sending a UDP probe packet which is loose-source routed through the source.

4. The method of claim 1, wherein step b(i) includes accessing a routing table in the current router to determine the next router.

5. The method of claim 1, wherein if both of steps b(i) and b(ii) fail to determine the next router, selecting an unknown next-hop router IP address.

6. The method of claim 5, including accessing a topology information database to resolve the unknown router.

7. The method of claim 1, including accessing a topology information database to resolve intra-router devices on the path.

8. The method of claim 1, wherein as soon as one router is determined, the next router is determined by an SNMP query of the one router.

9. An apparatus for determining a communications path between a source and a destination in an Internet Protocol (IP) network, comprising:
   a. means for determining a current router;
   b. means for determining a next router on the communications path from a current router based on a selected one of means b(i) and b(ii), wherein the last router determined is the current router:
      b(i) means for determining the next router via a Simple Network Management Protocol (SNMP) query of the current router;
      b(ii) means for determining the next router by sending a User Datagram Protocol (UDP) probe packet having a destination field with the destination IP address and a Time-To-Live (TTL) field with a value of one greater than the number of hops to the current router;
   c. means for iterating the means b. until the next router is determined to be the destination, wherein if the selected one of the means of b(i) and b(ii) fails, then the other one of the means of b(i) and b(ii) is utilized to determine the next router; and
   d. means for recording in a path list each determined next router on the path between the source and destination.

10. The apparatus of claim 9, including means for loose-source routing the UDP probe packet through the source.

11. The apparatus of claim 9, wherein the path determination is initiated by a means for sending a UDP probe packet which is loose-source routed through the source.

12. The apparatus of claim 9, wherein the means of b(i) includes means for accessing a routing table in the current router to determine the next router.

13. The apparatus of claim 9, further including means for selecting an unknown next-hop router IP address, wherein if both of the means of b(i) and b(ii) fail to determine the next router, the selecting means are initiated.

14. The apparatus of claim 13, further including means for accessing a topology information database to resolve the unknown router.

15. The apparatus of claim 9, further including means for accessing a topology information database to resolve intra-router devices on the path.

16. The apparatus of claim 9, wherein as soon as one router is determined, the means for determining the next router sends an SNMP query of the one router.

* * * * *

UNITED STATES PATENT AND TRADEMARK OFFICE
CERTIFICATE OF CORRECTION

PATENT NO. : 5,675,741
DATED : October 7, 1997
INVENTOR(S) : Aggarwal et al.

It is certified that error appears in the above-identified patent and that said Letters Patent is hereby corrected as shown below:

Col. 2, line 21 - after "by" insert -- SNMP --

Col. 6, line 5 - delete "locking" and substitute -- looking --.

Signed and Sealed this

Twenty-ninth Day of December, 1998

Attest:

BRUCE LEHMAN

Attesting Officer

Commissioner of Patents and Trademarks